United States Patent Office 3,345,839
Patented Oct. 10, 1967

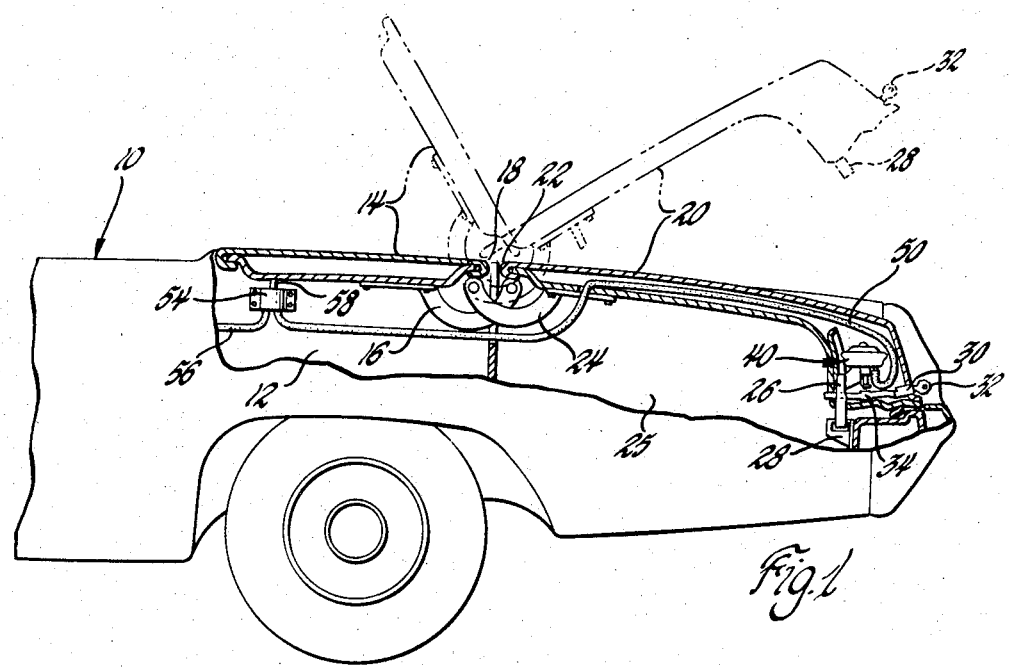

3,345,839
LATCH LOCKING ARRANGEMENT
Lawrence P. Brissette, Utica, Mich., assignor to General Motors Corporation, Detroit, Mich., a corporation of Delaware
Filed Aug. 16, 1965, Ser. No. 479,772
3 Claims. (Cl. 70—240)

ABSTRACT OF THE DISCLOSURE

In a locking arrangement for a key lock cylinder actuating assembly for a vehicle body deck lid latch or the like, the transmission shaft between the rotatable lock cylinder and the latch proper is provided with a portion formed for reception within a bifuracted end of a reciprocable locking plunger whereby the transmission shaft is blocked against actuating rotation. The plunger is reciprocated between blocking and nonblocking positions by a vacuum motor which is energized during a prescribed condition of the body wherein it is undesirable to have the deck lid latch operated for opening movement of the deck lid.

---

One feature of this invention is that it provides a new and improved locking arrangement for vehicle body closure latches of the type which are adapted for release by some exteriorly mounted manual actuating means such as a key-operated lock cylinder assembly. Another feature of this invention is that, for vehicle body deck lid or other latches of the above type, there is provided in combination with a key-operated lock cylinder assembly mounted on the exterior of the body and a transmission shaft between the lock cylinder and the latch, deactivating means selectively operable upon the transmission shaft to prevent movement thereof by the lock cylinder, thereby to prevent release of the latch. A further feature of this invention is that power operated means are provided for operating the deactivating means, the power operated means being operable during the existence of some predetermined condition of the body wherein release of the latch and movement of the closure are to be avoided. These and other features and advantages of the invention will be readily apparent from the following specification and drawings wherein:

FIGURE 1 is a fragmentary, partially broken away elevational view of a convertible vehicle body including a latch locking arrangement according to this invention, the deck lid and folding top well cover of the body being shown in closed and open positions in solid and broken lines respectively;

FIGURE 2 is an enlarged view of a portion of FIGURE 1; and

FIGURE 3 is a sectional view taken generally along the plane indicated by line 3—3 of FIGURE 2.

Referring now particularly to FIGURE 1 of the drawings, a convertible vehicle body 10 of generally conventional construction includes a folding top, not shown, adapted for movement between a raised position covering the passenger compartment of the body and a lowered position wherein the top is completely received within a top storage well 12. A top well cover panel 14 for covering well 12 is hingedly mounted by gooseneck members 16 pivoted on inner support structure of the body for generally rearward and upward swinging movement to a full open position, shown in broken lines, wherein the top is permitted to move between its raised and lowered positions. In the lowered position of the panel 14, shown in full lines, the rearward edge 18 thereof is closely juxtaposed to the forward edge 22 of the vehicle body deck lid 20, which is likewise mounted on the inner support structure by gooseneck hinges 24 for generally forward and upward swinging movement between closed and open positions relative to the rear compartment 25 of the body.

Referring to FIGURE 2, a latch 26 is provided for holding the deck lid 20 in its closed position. Latch 26 may be of many known types, but as generally depicted herein, the latch is similar to that disclosed in U.S. Patent 2,886,365, issued to R. M. Fox et al. on May 12, 1959, in that it includes a rotary forked bolt engageable in the closed position of the deck lid with a striker 28 and releasably held in engagement with the striker by suitable spring-biased detent means. As with most current production vehicle body deck lid latches, such detent means are adapted to be released for opening movement of the deck lid by an actuating lock cylinder assembly 30 mounted on the exterior or outer panel of the deck lid. Lock cylinder 30 is again of generally conventional construction and, as is further conventional, the lock cylinder is rotatable in a predetermined direction by a properly coded key 32 between a normal or operative ready position and a latch actuating position. For transmission of actuating rotation of lock cylinder 30 to latch 26, a transmission shaft 34 extends therebetween.

Returning to FIGURE 1, it is seen that the close spacing of the oppositely swinging deck panel 14 and deck lid 20 may present a problem in that the paths of movement of the adjacent edges thereof are such that the panel and deck lid may not be concurrently moved from their lowered to their raised positions without interference. To avoid the scratching, marring, or other potential damage to the surfaces of the panel and deck lid that might arise should an operator inadvertently open the deck lid while the well cover is in movement, a latch locking arrangement in accordance with the invention is provided.

Referring to FIGURES 2 and 3, shaft 34 is provided a short distance rearwardly of latch 26 with a flattened portion 36. Immediately thereabove, a bracket 38 secured to the frame of latch 26 supports a vacuum motor 40 of generally conventional construction. The flexible diaphragm 42 of the motor has centrally secured thereto by retainers one end of a plunger 44 slidably extending through the body of the motor and retained adjacent its lower end in a slot of a guide extension 46 of bracket 38. A coil compression spring 48 normally holds the diaphragm and plunger in the raised or inoperative position shown. As seen in FIGURE 3, the lower end of plunger 44 is suitably bifurcated, so that when moved downwardly under the force of vacuum actuation of motor 40, it will embrace the flattened portion 36 of shaft 34 to prevent rotation thereof from its operative ready position by lock cylinder 30.

For actuating the motor 40, a first vacuum conduit 50 secured at one end thereof to a port 52 of the motor extends through the deck lid and to a valve 54 mounted on the body adjacent the forward edge portion of panel 14. A second conduit 56 extends from valve 54 and to a vacuum storage tank, not shown, mounted in the engine compartment of the vehicle or otherwise. Valve 54 is provided with a plunger 58 which is engaged by panel 14 when in its closed position to actuate the valve into closed condition. When panel 14 is moved upwardly from closed position, valve 54 is allowed to open thereby to communicate the vacuum storage tank with the motor 40.

Thus, it will be seen that when the well panel 14 is raised to allow movement of the folding top into or out of well 12, motor 40 is energized to extend plunger 44 downwardly into embracing relation with the flattened portion 36 of shaft 34. The plunger thereby prevents actuating rotation of the shaft by lock cylinder 30, thereby to prevent release of latch 26 and movement of deck lid 20. Accordingly, the deck lid is not permitted to move until panel 14 has been returned to its closed position, whereat it engages the valve plunger 58 to close the valve and allow spring 48 to return plunger 44 to its inoperative position.

It will be apparent that the invention is not limited to the use of a vacuum motor actuator for the locking plunger 44 but rather, suitable electric motor means may be used which are responsive also to the movement of well 14, or suitable mechanical linkage may be connected between the panel 14 and the plunger 44 to provide for the required movement of the plunger in response to upward movement of the panel.

Having thus described my invention, what is claimed is:

1. In a vehicle body including a closure movable between open and closed positions and a latch for holding the closure in closed position, the combination comprising, a key rotatable actuating cylinder lock mounted on said body adjacent said latch, a transmission shaft operatively interconnecting said cylinder lock and said latch for transmitting actuating rotation of said cylinder lock for release of said latch, abutment means on said shaft, a forked blocking member movable relative to said shaft between a blocking position straddling said abutment means to prevent rotation of said shaft and a non-blocking position, power operated means for moving said blocking member between said positions thereof, and remote means for controlling said power operated means.

2. In a vehicle body including a closure movable between open and closed position and a latch for holding the closure in closed position, the combination comprising, a key rotatable actuating cylinder lock mounted on said body adjacent said latch, a transmission shaft operatively interconnecting said cylinder lock and said latch for transmitting actuating rotation of said cylinder lock for release of said latch, a reciprocable plunger member mounted on said body for movement toward and away from said transmission shaft and including a forked end portion, said shaft including an integral flattened portion formed for reception within the forked portion of said plunger when the latter is reciprocated toward said shaft whereby said plunger blocks rotation of said shaft, motor means operable upon said plunger and effective in a nonenergized condition thereof to locate said plunger in a nonblocking position away from said shaft, and remote control means for energizing said motor means to extend said plunger toward said shaft to said blocking position thereover.

3. The combination recited in claim 2 wherein said motor means include a vacuum motor spring-biased in deenergized condition to a position locating said plunger in nonblocking position, and valve means responsive to a prescribed condition of the vehicle body to apply vacuum to said vacuum motor.

References Cited
UNITED STATES PATENTS

| | | | |
|---|---|---|---|
| 1,726,724 | 9/1929 | Warren | 70—237 |
| 1,909,697 | 5/1933 | MacBeth et al. | 292—359 X |
| 2,382,985 | 8/1945 | Fitzgerald | 70—237 |
| 2,723,552 | 11/1955 | Dlugatch | 70—240 |
| 2,940,292 | 6/1960 | Heath | 70—241 |
| 3,199,322 | 8/1965 | Braun et al. | 70—240 |
| 3,282,369 | 11/1966 | Pangborn | 70—241 X |

BOBBY R. GAY, *Primary Examiner.*